(No Model.)
2 Sheets—Sheet 1.
A. CROSBY.
MACHINE FOR FILLING CANS WITH MEAT, FISH, &c.
No. 262,575. Patented Aug. 15, 1882.
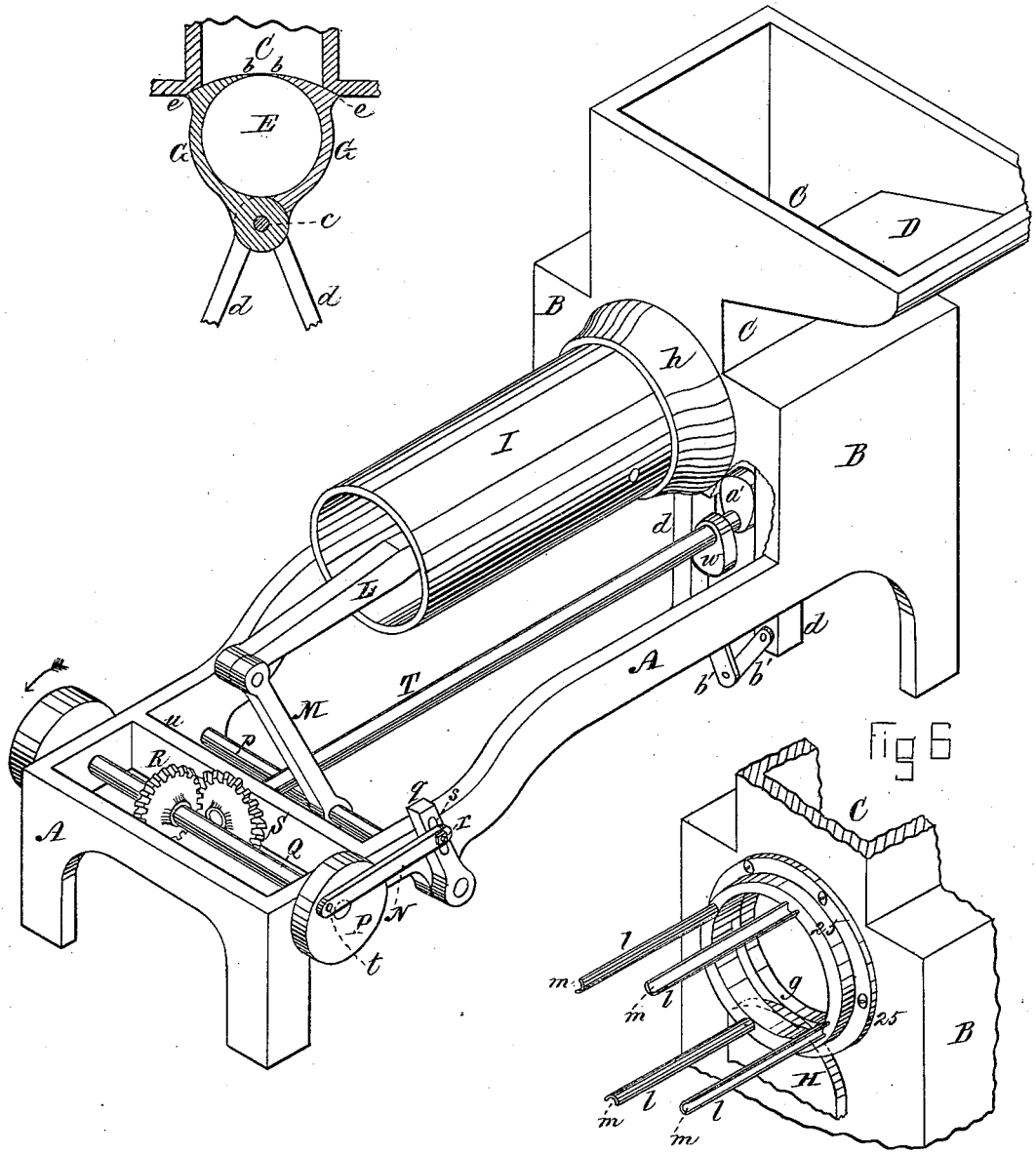
WITNESSES
W. J. Cambridge
Henry H. Brown
INVENTOR
Augustine Crosby (No Model.) 2 Sheets—Sheet 2.
A. CROSBY.
MACHINE FOR FILLING CANS WITH MEAT, FISH, &c.
No. 262,575. Patented Aug. 15, 1882.
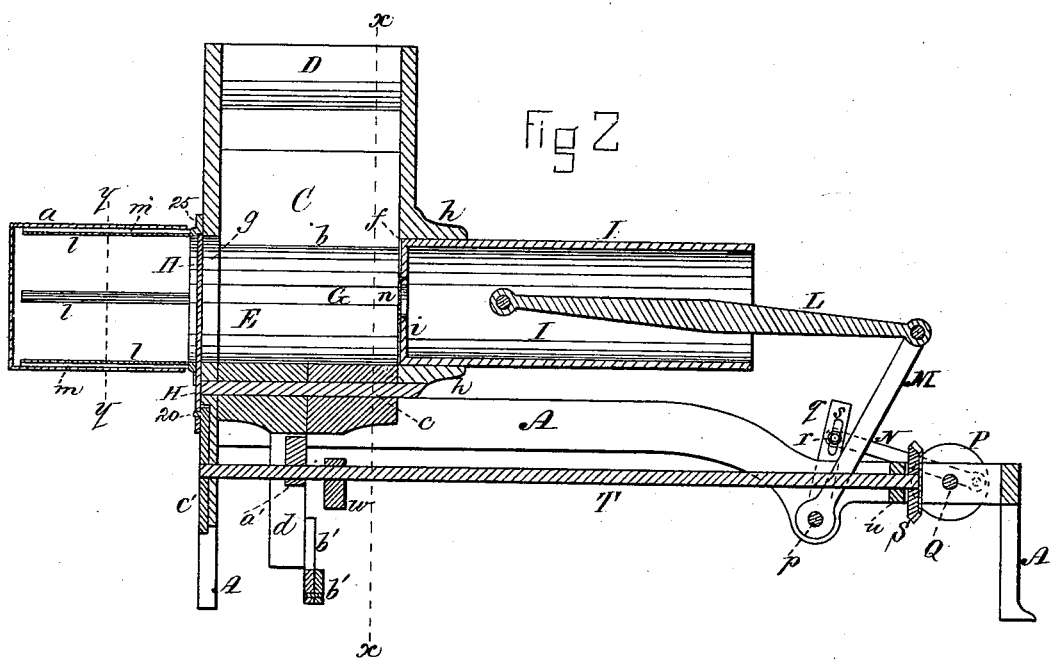
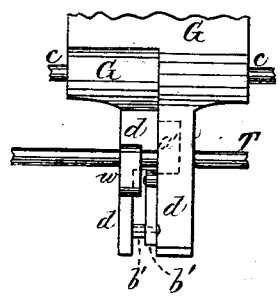
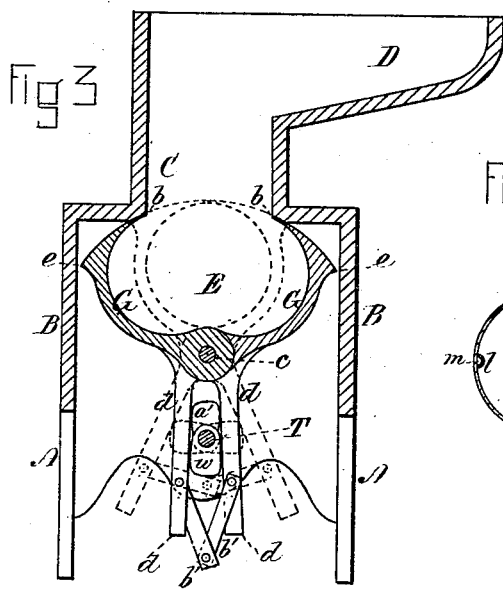
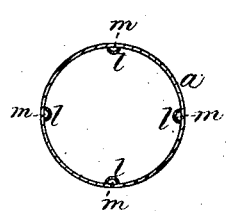
WITNESSES
W. J. Cambridge
Harry H. Brown.
INVENTOR
Augustine Crosby
per E. Teschemacher
Atty

UNITED STATES PATENT OFFICE.

AUGUSTINE CROSBY, OF BENTON, MAINE.

MACHINE FOR FILLING CANS WITH MEAT, FISH, &c.

SPECIFICATION forming part of Letters Patent No. 262,575, dated August 15, 1882.

Application filed January 9, 1882. (No model.)

*To all whom it may concern:*

Be it known that I, AUGUSTINE CROSBY, a citizen of the United States, residing at Benton, in the county of Kennebec and State of Maine, have invented certain Improvements in Machines for Filling Cans with Meat, Fish, &c., of which the following is a full, clear, and exact description, reference being had to the accompanying drawings, making part of this specification, in which—

Figure 1 is a perspective view of a can-filling machine constructed in accordance with my invention. Fig. 2 is a longitudinal vertical section through the center of the same. Fig. 3 is transverse vertical section through the same on the line $x\ x$ of Fig. 2; Fig. 4, detail in elevation. Fig. 5 is a vertical section through the can and its supporting-bars on the line $y\ y$ of Fig. 2; Fig. 6, detail in perspective. Fig. 7 is a vertical section through the cutters when closed together.

My invention relates to certain improvements in machines for filling cans with meat, fish, and other solid edible substances, to be hermetically sealed for the market. In some machines of this description, as heretofore constructed, a pair of semi-cylindrical knives or cutters arranged to rotate about a longitudinal axis, one within the other, in concentric circles, have been employed to cut the meat, fish, &c., delivered thereto from a chute or hopper and properly shape it to fit into the can to be filled. These cutters, when opened to their full extent by rotating them on their axis, so that one will lie snugly within the other, form a semi-cylindrical chamber or receptacle of a size adapted to contain only one-half of the contents of the can to be filled, the meat or fish in the chute above being forcibly pressed directly down into the receptacle and extending up above the upper edges of the cutters, which, as they are rotated, cut off a portion of suitable size and shape to fit the can to be filled, and as the meat or fish is soft and elastic the mass of material above the cutters must be held down while they are operating, in order that a sufficient quantity may be cut off to properly fill the can. To effect this pressure requires the expenditure of considerable power, while the mechanism employed within the chute to produce this pressure is in the way and interferes with the proper sorting and arranging by hand of the pieces of meat or fish before they reach the cutters, while the juices are expressed and escape at various points, thus running to waste, whereby the quality of the meat or fish is injuriously affected. Furthermore, as the cutters fit one within the other when opened, they do not form a true circle when closed up to make the cut, and it therefore becomes impossible to make the cylindrical plunger employed to force the substance into the can fit accurately within the chamber formed by the closed cutters, the space thus left between the plunger and the interior of the cutters affording an opportunity for tough fish-skins and sinews to catch between the edges of the cutters and become twisted or jammed, so as not to be carried forward by the plunger, when they will accumulate and cause the machine to become clogged or obstructed, while it frequently happens that one end of a long piece of skin or sinew will become caught while the other end is carried by the plunger into the can, and when the latter is removed from the machine its contents will be drawn out in consequence of one end of this piece of skin being still held fast in the machine, causing much delay and waste of time and material.

In some machines the meat or fish is forced into a nearly circular die or receptacle and cut off by a straight knife; but this construction is objectionable, as the portion of meat or fish is not properly shaped to fit the can, being left flat on one side, and a great pressure has to be exerted to force the meat or fish into the die, while all of the machines heretofore constructed for filling cans employ springs and are generally complicated and liable to get out of order on account of the great variety of irregular movements necessarily imparted to the different portions of the mechanism.

My invention has for its object to overcome all of these difficulties; and it consists in the combination, with the chute, of a pair of semi-cylindrical knives or cutters so pivoted or hinged together as to open and close in the arc of a circle having its center in or near the line of their circumference, whereby they are adapted, when open, to receive the material from the chute, and when closing or advancing toward each other to gather together, cut off, and firmly compress the said material received from the chute and properly shape it to fit the can to be filled, thus enabling me to dispense with the heavy pressure heretofore required to force the material from the chute to the cutters.

My invention also consists in the combination, with the chute and a pair of semi-cylindrical shaping and compressing cutters, constructed and operating as described, of levers secured to said cutters and actuated by cams or other suitable operating mechanism.

My invention also consists in the combination, with a pair of semi-cylindrical shaping and compressing cutters so pivoted or hinged together as to open and close in the arc of a circle having its center in or near the line of their circumference, and form when closed a true cylinder, of a reciprocating piston or plunger adapted to accurately fit within the space or chamber formed by the said cutters when closed, and thereby insure the discharge of the entire contents of the chamber, whereby the machine is prevented from becoming clogged by the introduction of any portion of the material in the chamber between the piston and the inner surfaces of the cutters.

My invention also consists in providing the piston or plunger with an automatic vacuum-valve for admitting air into the chamber in which the meat or fish is compressed for the purpose of preventing the formation of a vacuum therein on the withdrawal of the piston.

My invention also consists in the combination, with the semi-cylindrical shaping and compressing cutters, constructed and operating as described, and the casing and chute, of a reciprocating piston or plunger actuated by certain mechanism, as hereinafter set forth, whereby the machine is simplified and rendered more durable and effective in its operation.

My invention also consists in the combination, with the reciprocating piston and its actuating mechanism, of certain mechanism for operating the semi-cylindrical cutters, so constructed and connected as to cause the cutters to be entirely closed to form a true cylinder before or immediately after the piston reaches them on its forward stroke, as hereinafter set forth.

My invention also consists in supporting the can upon a series of bars of U or V shape in cross-section, so arranged as to form exit-passages for the escape of the air from the can while it is being filled.

My invention also consists in securing the can-supporting bars to a removable ring attached to the front of the casing, said ring forming a guide for the sliding gate, which closes one end of the chamber in which the meat or fish is compressed, as hereinafter set forth.

In the said drawings, A represents the framework of the machine, at one end of which is a rectangular casing, B, from which rises a vertical chute, C, for receiving the cut pieces of meat, fish, &c., which are delivered thereto from the inclined hopper D, whence they drop down into a receiving and compressing chamber, E, located directly under the chute. This receiver is composed of two semi-cylindrical plates, G, provided with cutting-edges b, and pivoted or hinged together at a point, c, at or near the circumference of the circle formed by their curved interior surfaces when closed together, as seen Fig. 7, and dotted in Fig. 3, each of these plates G having secured to it near its bottom edge a lever, d, by which it is opened or closed, as will be hereinafter described. The length of the cutters G corresponds to that of the interior of the chute C, and also to that of the can a to be filled; and when the cutters are separated or thrown open to their full extent by the movement of their levers d, actuated by cams to be hereinafter described, the cutting-edges b will be in line with the vertical walls of the chute, as seen in Fig. 3, the receptacle or chamber E thus formed being capable of holding a quantity of material more than sufficient to fill the can. As soon as the meat or fish has dropped from the chute into the receptacle formed by the cutters G the latter are advanced toward each other until their cutting-edges b meet or slightly overlap, thus causing the meat or fish in the receiver to be cut off or separated from the mass of material in the chute above. This movement of the cutters, as will be seen, takes place in the arc of a circle having its center at c, in or nearly in the line of the circumference of the receiver when closed, and resembles that of the jaws of a pair of round pinchers, and consequently the meat, fish, &c., is gathered together while being cut off and forcibly compressed and solidified into a shape and size to fit the interior of the can to be filled without the employment of any pressure device in the chute, as heretofore, whereby the machine is simplified and the chute left at all times free and unobstructed, which admits of the pieces of meat or fish being conveniently sorted and arranged by hand in the hopper and chute just before reaching the cutters, which is a great advantage, and cannot be accomplished where a pressure device is placed within the chute. Furthermore, in my improved machine the valuable juices are not expressed from the meat or fish before it reaches the cutters and allowed to escape and go to waste, as heretofore, but are all retained within the receiving and compressing chamber E and saved to go forward with the meat or fish into the can.

The outer surfaces of the cutters G, from b to e, are curved in the arc of a circle struck from the pivotal point c as a center, whereby they are at all times kept snugly up against the lower edges of the chute C, tight joints being thus formed to prevent the escape of any liquid or juices from the chute. When the cutters are being brought together to compress their contents one end of the compression-chamber E is closed by a gate, H, operated automatically by mechanism to be hereinafter described, the other end being closed by the side of the casing B and the end of a horizontal reciprocating piston or plunger, I. This piston is of circular form in cross-section, and passes through correspondingly-shaped apertures $f$ $g$ in the sides of the casing B, being supported in a suitable guide, $h$, attached to or forming a part thereof. The piston I, which is hollow and closed at its front end by a head, $i$, is adapted to pass horizontally through the receiving-chamber E and force or push the cylindrical piece of meat or fish compressed between the closed cutters G out through their open ends and through the aperture $g$ into the cylindrical can $a$, which has been previously placed in front thereof upon a series of supporting-bars, $l$, of U or V shape in cross-section, which, when the can is in place, extend nearly to its bottom, the open sides of the bars facing outward, by which construction, as the meat or fish is forced into the can by the piston, the air contained in the can is free to escape through the grooves or conductors $m$ formed between the interior of the can and the U or V shaped bars $l$. Before the piston commences to advance the gate H is withdrawn, and as the can is filled it is gradually pushed off its supporting-bars $l$, and on the piston being retracted the filled can is replaced by an empty one to be filled in the same manner. The supporting-bars $l$ are secured to a removable ring, 25, which is secured by screws to the side of the casing B, and is grooved on its inner side to form a guide for the sliding gate H, by which construction the renewal or repairing of the bars $l$, in case they should become broken or bent, is facilitated.

It will be seen that as the cutters, when closed together, form a perfectly cylindrical chamber, the piston can be made to fit therein with the most perfect accuracy, and consequently the ejection thereby of the entire contents of the chamber is insured, and all liability of tough fish-skins or sinews becoming caught between the cutters or getting twisted or jammed between the piston and sides of the cutters, as heretofore, is entirely avoided, together with all liability of the machine becoming clogged from this cause, for the reason that everything within the chamber is necessarily carried forward by the tight-fitting piston.

As the piston fits so accurately within the cutters G, provision should be made to admit air in front of the piston as it is withdrawn. Otherwise the meat or fish might be partially drawn out of the can by the formation of a vacuum within the chamber E in the event of the filled can being accidentally pushed in again over the supporting-bars, as might sometimes occur. This is accomplished by providing the head $i$ of the piston with a vacuum-valve, $n$, adapted to open outward automatically as the piston is withdrawn, and thus admit air from its hollow interior into the chamber E.

I will now describe the manner in which the piston I is reciprocated and the cutters G operated.

Within the interior of the piston is pivoted one end of a connecting-rod, L, the opposite end of which is pivoted to a lever, M, secured to a rock-shaft, $p$, having its bearings in the frame-work A, and carrying at one end an arm or lever, $q$, to which is secured by a screw-bolt, $r$, passing through a slot, $s$, one end of a connecting-rod, N, the opposite end of which is secured to a crank-pin, $t$, on a disk, P, keyed to one end of the driving-shaft Q, and thus as the latter is rotated the piston is reciprocated as required, the length of its stroke being readily adjusted by means of the bolt $r$ and slot $s$ in the arm $q$.

To the driving-shaft Q is secured a bevel-gear, R, which drives a similar bevel-gear, S, upon one end of a long horizontal shaft, T, having its bearings in one end of the frame-work and a transverse bar, $u$, and extending centrally beneath the cutters G and between their levers $d$. To this shaft T are secured, at a short distance apart, a pair of cams, $w$ $a'$, which are adapted to impinge upon the inner surfaces of the levers $d$, and thus force them apart for the purpose of closing the cutters G together, each cam being so located upon the shaft that it will act upon one lever $d$ only, and not interfere in its revolutions with the opposite lever. The levers $d$ are actuated in the opposite direction to throw the cutters G open by the cam $w$, which in its revolution strikes one of a pair of links, $b'$ $b'$, which are pivoted together and to the levers $d$, the depression of these links causing the lower ends of the levers to approach each other, and thus open the cutters. If desired, however, the levers $d$ may be so weighted as to drop down by their own gravity when permitted to do so by the movement of the cams, and thus close the cutters without the employment of the links $b'$; but when the levers $d$ are so weighted it is best to employ some device for starting them with a positive movement, to guard against the sticking of the cutters together and their failure to open from this cause.

To the outer end of the shaft T is secured a disk, $c'$, provided with a crank-pin, 20, which works in a horizontal slot in the lower portion of the vertically-sliding gate H, which is by this means advanced at the required time to close one end of the compression-chamber E before the cutters G are brought together, and withdrawn to allow of the discharge of the material into the can by the piston I on its forward stroke.

The movements of the various portions of the mechanism are all so timed with respect to each other as to avoid any possibility of interference or breakage, each part performing its particular function at the required time.

When the piston I is at the end of its backward stroke the cutters G are wide open, the arrangement of the mechanism being such that when the connecting-rod N and crank-pin $t$ are passing the center, and the movement of the piston I consequently at its minimum, the cams $w$ $a'$ on the shaft T are acting to close the cutters, which are thus brought together to form a perfect cylinder before or immediately after the piston reaches them on its next forward stroke.

The mechanism above described for reciprocating the plunger is exceedingly simple and easily adjusted, and operates in both directions with a steady positive motion, thus avoiding the jar which is liable to occur where pins or cams are suddenly brought into contact with levers or other mechanism temporarily at rest, while no springs are employed in any portion of the machine, and consequently its action is more reliable and the liability of its getting out of order greatly diminished. I do not wish, however, to confine myself to the particular mechanism herein described for actuating the piston I or the pivoted cutters G or gate H, as it is evident that its construction may be varied without departing from the spirit of my invention.

What I claim as my invention, and desire to secure by Letters Patent, is—

1. In a can-filling machine, the combination, with the chute C, of a pair of semi-cylindrical cutters, G, so pivoted or hinged together as to open and close in the arc of a circle having its center in or near the line of their circumference, whereby they are adapted, when open, to receive the material from the chute, and when closing or advancing toward each other to gather together, cut off, and firmly compress the said material received from the chute and properly shape it to fit the can to be filled, substantially as set forth.

2. In a can-filling machine, the semi-cylindrical shaping and compressing cutters G, adapted to receive the material from the chute, and so pivoted or hinged together as to open and close in the arc of a circle having its center in or near the line of their circumference, in combination with the chute C and the levers $d$, actuated by the cams $w$ $a'$ on the shaft T or other suitable operating mechanism, substantially as described.

3. In a can-filling machine, the combination, with a pair of semi-cylindrical shaping and compressing cutters, G, so pivoted or hinged together as to open and close in the arc of a circle having its center in or near the line of their circumference, and form when closed a true cylinder, of a reciprocating piston or plunger, I, adapted to accurately fit within the space or chamber formed by the said cutters when closed, and thereby insure the discharge of the entire contents of the chamber, whereby the machine is prevented from becoming clogged by the introduction of any portion of the material in the chamber between the piston and the inner surfaces of the cutters, substantially as set forth.

4. In a can-filling machine, the combination, with the semi-cylindrical shaping and compressing cutters G, of the reciprocating hollow piston I, having a head, $i$, provided with an automatic vacuum-valve, $n$, adapted to admit air into the chamber E in front of the piston as it is withdrawn, substantially as and for the purpose described.

5. In a can-filling machine, the combination, with the semi-cylindrical shaping and compressing cutters G, operating as described, and the casing B and chute C, of the reciprocating piston or plunger I, with its connecting-rod L, lever M, rock-shaft $p$, slotted lever $q$, connecting-rod N, and actuating-disk P, all constructed to co-operate substantially in the manner and for the purpose set forth.

6. In a can-filling machine, the combination, with the reciprocating piston I and its actuating mechanism, of the shaft T and mechanism connected therewith for operating the semi-cylindrical cutters G, so connected as to cause the cutters to be entirely closed, to form a true cylinder, before or immediately after the piston reaches them on its forward stroke, substantially as described.

7. In a can-filling machine, the combination, with the casing B, the shaping and compressing cutters G, and the reciprocating piston I, of the can-supporting bars $l$, made of U or V form in cross-section, and arranged with their open sides outward to form outlets or exit-passages for the escape of the air from the can as it is being filled, substantially as set forth.

8. In a can-filling machine, the can-supporting bars $l$, secured to a removable ring, 25, attached to the front of the casing B, said ring forming a guide for the sliding gate H, substantially as described.

Witness my hand this 24th day of December, A. D. 1881.

AUGUSTINE CROSBY.

In presence of—
P. E. TESCHEMACHER,
W. J. CAMBRIDGE.